CLASSIFYING AND REDUCING METHOD AND APPARATUS

Filed April 11, 1961 10 Sheets-Sheet 1

INVENTOR.
CLEO HAROLD KIDWELL

BY
Brumbaugh, Free, Graves & Donohue his ATTORNEYS

May 24, 1966 C. H. KIDWELL 3,252,663

CLASSIFYING AND REDUCING METHOD AND APPARATUS

Filed April 11, 1961 10 Sheets-Sheet 2

INVENTOR.
CLEO HAROLD KIDWELL

BY

Brumbaugh, Free, Graves & Donohue his ATTORNEYS

INVENTOR.
CLEO HAROLD KIDWELL

BY

Brumbaugh, Free, Graves & Donohue his ATTORNEYS

May 24, 1966 C. H. KIDWELL 3,252,663

CLASSIFYING AND REDUCING METHOD AND APPARATUS

Filed April 11, 1961 10 Sheets-Sheet 4

INVENTOR.
CLEO HAROLD KIDWELL

BY

Brumbaugh, Free, Graves & Donohue his ATTORNEYS

May 24, 1966 C. H. KIDWELL 3,252,663

CLASSIFYING AND REDUCING METHOD AND APPARATUS

Filed April 11, 1961 10 Sheets-Sheet 5

INVENTOR.
CLEO HAROLD KIDWELL

BY his ATTORNEYS

May 24, 1966 C. H. KIDWELL 3,252,663

CLASSIFYING AND REDUCING METHOD AND APPARATUS

Filed April 11, 1961 10 Sheets-Sheet 6

INVENTOR.
CLEO HAROLD KIDWELL

BY
Baumbaugh, Frey, Graves & Donohue his ATTORNEYS

CLASSIFYING AND REDUCING METHOD AND APPARATUS

Filed April 11, 1961

INVENTOR.
CLEO HAROLD KIDWELL
BY
Brumbaugh, Free, Graves & Donohue
his ATTORNEYS

CLASSIFYING AND REDUCING METHOD AND APPARATUS

Filed April 11, 1961 10 Sheets-Sheet 8

INVENTOR.
CLEO HAROLD KIDWELL
BY
Brumbaugh, Free, Graves & Donohue
his ATTORNEYS INVENTOR.
CLEO HAROLD KIDWELL
BY
Brumbaugh, Free, Graves & Donohue
his ATTORNEYS

CLASSIFYING AND REDUCING METHOD AND APPARATUS

Filed April 11, 1961 10 Sheets-Sheet 10

INVENTOR.
CLEO HAROLD KIDWELL
BY
Brumbaugh, Free, Graves & Donohue
his ATTORNEYS 3,252,663
Patented May 24, 1966

3,252,663

CLASSIFYING AND REDUCING METHOD AND APPARATUS

Cleo Harold Kidwell, Short Hills, N.J., assignor to Reduction Engineering Corporation, Newark, N.J., a corporation of New Jersey Filed Apr. 11, 1961, Ser. No. 102,208
22 Claims. (Cl. 241—39)

The present invention relates to a system for classifying and treating materials, and more specifically, to an improved method and apparatus by which heterogeneously sized materials may be classified continuously under controlled conditions into two or more finished products having sharply defined ranges of particle sizes.

Many systems have been proposed for classifying and treating materials, but these systems have failed to solve a number of problems confronting modern industry. One such problem is specific to the flour milling and grain industry, and is the failure on the part of conventional systems to obtain a sharp separation in protein or protein-bearing particles, and in particular, a sharp separation of such particles in particle size ranges of about 20, 30, and 40 micron cuts.

A further problem exists in situations where exacting specifications require that the particles classified fall completely below a particular mesh, for instance, 325 mesh. Many products commercially available are unsatisfactory for a number of purposes because a fraction of a percent of oversize particles may appear among the classified material. Apparatus heretofore available have been unable to remove the objectionable oversize material without carrying over with the oversize material too much of the valuable material below the mesh specified. Many ores, minerals, chemicals and pharmaceuticals have not been acceptable for commercial uses because they do not meet rigid mesh specifications.

According to the invention, there is provided an endless elongated conduit disposed about a common axis to form a substantially closed circuit and having both straight and curved portions therein. Means are provided for supplying fluid to the conduit and for entraining and conveying material therein. At a point removed from said means, the tubular conduit is provided with discharge means positioned on an inner periphery of one of said curved portions and extending angularly therefrom in a direction approximately reverse to that of the fluid flow in the conduit. At least one additional outlet means is provided, generally in an outer periphery of one of said curved portions, and a second tubular conduit is provided which is in fluid communication with said additional outlet means. A double inverse helical flow is established in each of the first and second conduits providing areas of minimum and maximum velocities, and areas of high and low static and velocity pressures. By a novel utilization of this flow in the two conduits, heterogeneous material may be continuously introduced into the apparatus to be continuously classified into two or more finished products having sharply defined ranges of particle size.

Specifically, classification is obtained by positioning discharge areas for the conduits and outlet or fluid communicating passageways between the multiple tubular conduits in a particular relationship with each other and at predetermined points in the conduits, and at the same time by adjusting the flow patterns in the conduits in relation to the locations of the discharge areas and outlets. By a novel utilization of the flow patterns and differential pressures in the conduits, a flow from one conduit into another and to collection devices associated with the discharge areas is obtained to produce two or more finished products having sharply defined ranges of particle sizes.

Endless elongated tubular conduits, of the general type to which the present invention relates, have been used heretofore for grinding materials to low micron particle size. In such apparatus, the fluid flow in the conduit has been used as the medium of energy to perform the grinding. Practically the entire function of such apparatus has been directed to grinding the material introduced into the apparatus, and classification has been only of secondary concern. Generally, the apparatus has been capable only of classifying the entire product to a low micron particle size.

In the present invention, classification is of principal concern, although some treating and grinding of material may be effected, if desired. In particular, by the present invention, classification into sharply defined ranges is effectively achieved with heterogeneous material from about 30 microns up to about 80 mesh.

Further advantages of the invention are that classification of materials may be obtained with unusually low power and capital costs. Also, by the invention, means are provided by which fine particles inadvertently removed with coarse particles during classification may be reintroduced continuously, with no additional power cost, into the apparatus.

The term "fluid," as used herein, shall be deemed to encompass compressible fluids, such as air, steam and other gases, and incompressible fluids, such as water and other liquids.

Other advantages and features of the invention will become apparent upon further consideration of the specification and the accompanying drawings, in which.

Figure 1:
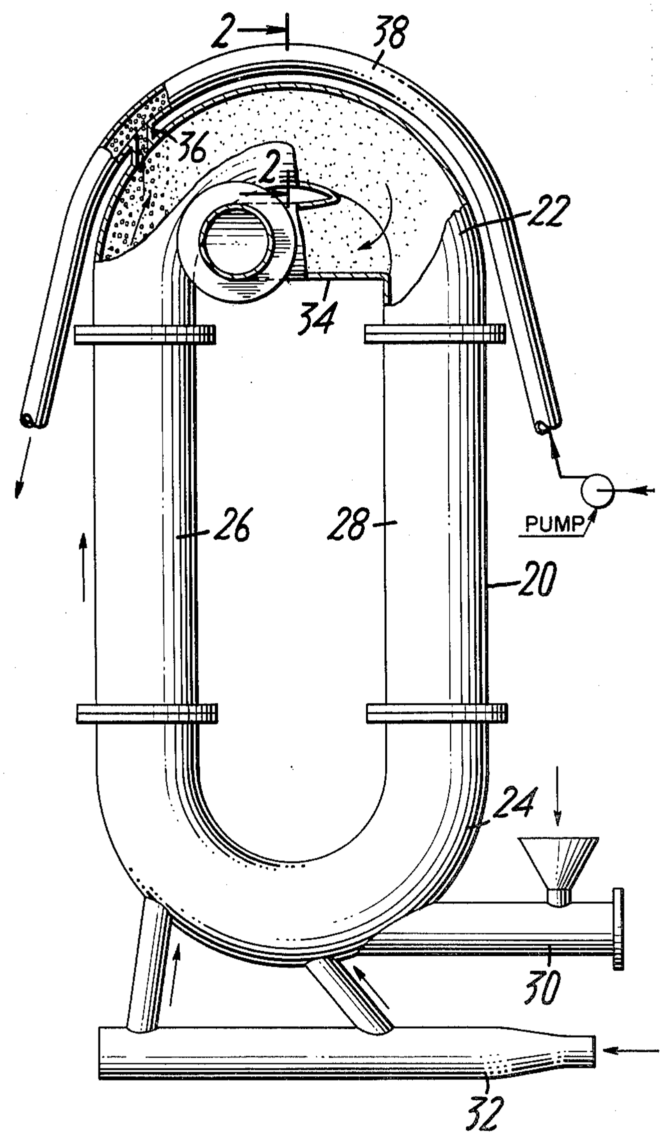
FIGURE 1 is an elevation side view of a classifying apparatus according to the invention.

Referring to FIG. 1, there is illustrated an endless elongated tubular conduit 20 disposed about a common vertical axis and having upper and lower U-shaped curved sections 22 and 24, respectively, each having a total curvature of about 180°, the curved sections being connected by straight sections 26 and 28 to form a closed circuit. In the embodiment illustrated, the tubular conduit is of substantially circular cross-section, but may have any other cross-sectional configuration, for instance, a triangular, rectangular, or oval configuration, which produces the desired results. Also, the cross-sectional area of the tubular conduit is shown as constant, but the cross-sectional area may be varied along the length of the conduit according to the concepts of the invention to tailor the products to the desired particle sizes.

An input tube 30 is provided supplying fluid tangentially into a lower portion of the curved section 24 of the classifying conduit and creating in the conduit a fluid flow in a clockwise direction. Preferably, the tube 30 is arranged, as shown, so that the material to be classified is entrained in the fluid prior to entering the classifying conduit 20. An additional input tube 32 may be provided by which fluid, and entrained material if desired, is introduced into the classifying conduit. Primarily, the additional input tube is arranged so that the fluid introduced is effective in setting up in the classifying conduit the flow patterns and pressure gradients desired. Further input tubes may be provided for this purpose if necessary.

Fine particles obtained by classification are exhausted through discharge means 34 positioned on an inner wall of the upper curved section 22 at a point removed from the input means 30, the discharge means extending angularly from the classifying conduit in a direction substantially reverse to that of the fluid flow in the conduit. In the embodiment illustrated in FIG. 1, an additional outlet means 36 is positioned in an outer wall of the upper curved section 22, which outlet means is in communication with a second tubular conduit 38. The secondary conduit is shown as arranged annularly about and concentric with the outer periphery of the upper curved section 22, and may comprise a continuously curved open-ended section, as shown, or one having curved and straight portions, or may comprise a closed circuit conduit as will be described.

In the secondary conduit, a fluid flow is induced and may be in the same direction as the fluid flow in the classifying conduit 20, or in an opposite direction. Also, the fluid in the conduit may have material entrained therein.

The entire apparatus is preferably oriented about a common vertical axis, although satisfactory results may be obtained by any other orientation.

Figures 3, 16, 17:
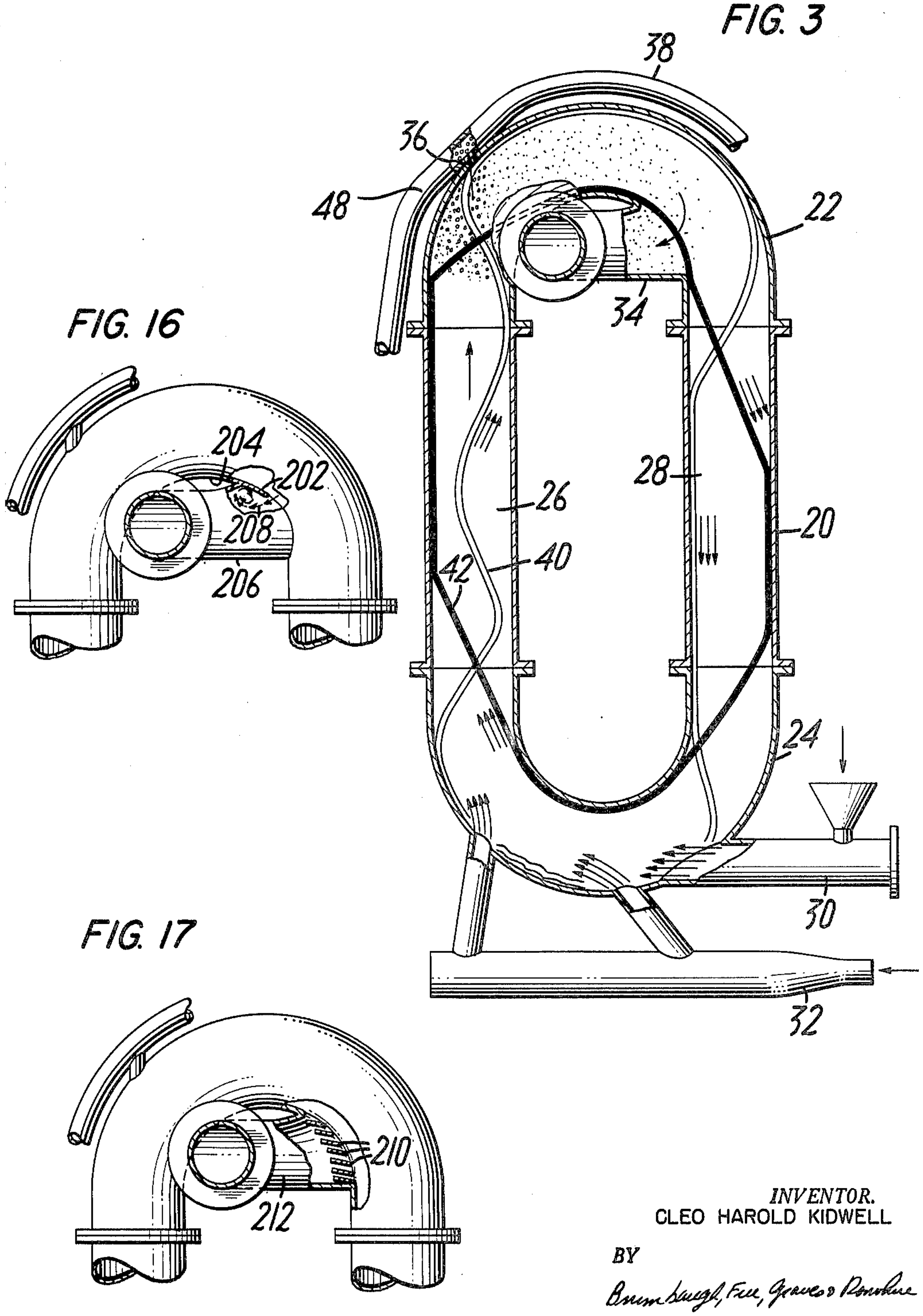
FIGURE 3 is a section view of the apparatus of FIG. 1 illustrating the patterns of flow induced in the apparatus.
FIGURES 16–24 illustrate novel discharge and outlet means in accordance with the concepts of the invention.

In FIG. 3, there is illustrated a fluid flow pattern which may be induced in the first tubular or classifying conduit 20. Essentially, the flow pattern consists of areas or paths of minimum and maximum velocities extending through the conduit adjacent to the inner and outer walls of the conduit, the double line 40 representing the path of minimum velocity, the solid line 42 representing the path of maximum velocity. It will be observed that the paths of minimum and maximum velocities are constantly changing their positions with respect to each other as the fluid passes through the classifying conduit. It will also be observed that the outlet means 36 is positioned in an area of low velocity and high static pressure.

Pressure measurements taken in the system show that in general the highest static pressures in the system coincide with the curve of minimum fluid velocity and the lowest static pressures coincide with the curve of maximum fluid velocity. This fact is utilized in obtaining the classification desired.

Figure 2:
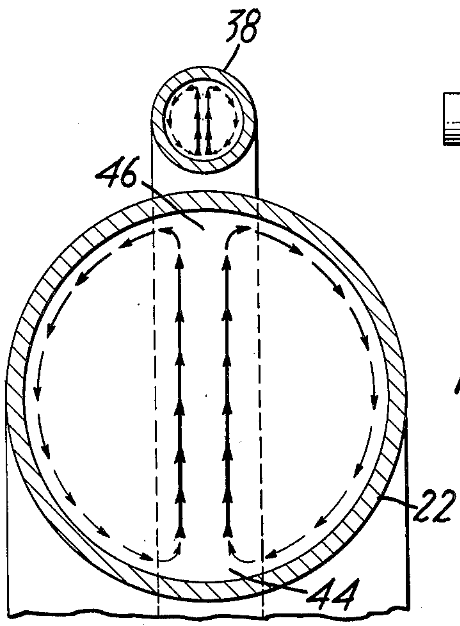
FIGURE 2 is a section view taken along line 2—2 of FIG. 1.

Referring to FIG. 2, a double inverse helical flow pattern which may be set up in the tubular conduit 20 in section 22 is illustrated. At the particular point at which the section view is taken, the area of maximum velocity in the conduit is adjacent to the inner wall of the curved section 22 and designated by the numeral 44, whereas the area of minimum velocity is adjacent the outer wall of the curved section 22 and designated by the numeral 46. The particular double, helical flow pattern illustrated by the dark and light shading of the arrows may be obtained as an example by introducing air into the classifying conduits, by input tubes 30 and 32, positioned as shown in FIG. 3, at a blower pressure of 2–4 p.s.i. and at a rate of 1,000 c.f.m., the pressure in the classifying conduit being 2.2 inches of mercury. Entrained in the incoming fluid may be particles from 10–100 microns, introduced at a rate of feed of 1,000 pounds per hour.

The same double inverse helical flow pattern may be set up in the secondary conduit 38, as shown in FIG. 2, by introducing air into the conduit, preferably in a counter-clockwise direction opposite to the direction of flow in the classifying conduit 20, at a pressure of 1.4 inches of mercury and at a rate of 300 c.f.m. By the same mechanisms involved in the classifying conduit 20, substantially the same flow paths of minimum and maximum velocities obtained in the classifying conduit 20 are also obtained in the secondary conduit 38.

It will be evident (by appropriately applying the velocity paths 40 and 42 to the secondary conduit 38) that an area of low static pressure and maximum velocity is created in the secondary conduit 38 adjacent to the point 36 of fluid communication between the conduits. This area of low static pressure will be, accordingly, adjacent to an area of high static pressure and minimum velocity in the classifying conduit 20. If the fluid in the secondary conduit passes through the conduit in a direction opposite to the direction of fluid flow in the classifying conduit, the greatest differential in pressure between the conduits at point 36 will be obtained. It is this differential in static pressures, in conjunction with the double inverse helical flow patterns in the conduits, which achieves the classification desired. By varying the flow velocities in the conduits, directions of flow, positions of the fluid communicating passageways, areas of introduction of additional fluid, and shape or configuration of the conduits, the differential pressure may be varied and a sharp control of the particle sizes passing through outlet means 36 may be obtained.

Operation of the apparatus will now be described.

The coarser or heavier particles having greater mass tend to follow the outer wall in the curved sections and the inner wall in the straight sections, whereas the particles having lesser mass tend to concentrate at the inner wall in the curved sections and the outer wall in the straight sections. Thus, the particles having greater mass are entrained in the path of lower velocity, whereas the finer particles having lesser mass tend to be entrained in the path of maximum velocity.

The particles of fine micron size adhering to the inner wall or periphery of the upper curved section 22 (FIGS. 1 and 3) easily reverse direction and are discharged with the fluid through discharge means 34 to a suitable collection device. If coarser particles of greater mass approach the discharge means 34, they are unable to reverse their direction of travel to pass through the discharge means, but are instead carried past the discharge area at a high velocity.

A corresponding discharge area in the lower section 24 for removal of fine particles is not as satisfactory as the inner surface of the curved section 22, because of the turbulence induced in the section 24 by the introduction of material and fluid through the input means 30 and 32. However, the high velocity flow (represented by the solid line 42) will inevitably break away or separate from the inner periphery or radius of curvature of the section 24, which separation creates an area of negative pressure affording a useful position for reintroducing fluid and/or material into the system. This will be described subsequently and in detail with respect to an embodiment of the invention.

The coarser particles of greater mass resist change in direction due to tangential force. Consequently, their path tends to coincide with the path of minimum velocity (the double line 40). They contact, therefore, the outer wall or periphery of the upper curved section 22 at a point adjacent to outlet means 36 in communication with the secondary conduit 38. Because of tangential force and the differential in pressure because adjacent areas of the concentric conduits, the coarser particles tend to travel into the fluid flow of the secondary conduit.

Coarse particles which are not classified through the communicating passageway or outlet means 36 are recirculated to be classified in subsequent cycles of travel. As indicated above, the coarse particles do not reverse direction to exit through discharge means 34.

Preferably, the secondary conduit 38 is of a smaller diameter than the classifying conduit 20 to conserve fluid and the expenditure of power, but the diameter of the conduit 38 may be any diameter necessary to obtain the desired results. Also, the preferred direction of fluid flow in a counter-clockwise direction in conduit 38 provides finer classification, but the fluid flow may be in the opposite direction.

The fluid velocity in the secondary conduit 38 may or may not be the same as the fluid velocity in the classifying conduit 20. In fact, the velocity in conduit 38 may advantageously be varied to contribute to or counteract the effect achieved by the double inverse helical flow set up in the conduit, making possible a sharp control of the size of particles passing through the outlet means and communicating passageway 36.

It is possible to have unclassified material entrained in the flow introduced into the secondary conduit 38, the fine particles in the flow in the secondary conduit following the pattern of the double inverse helical flow and traveling through the communicating passageway 36 into the classifying conduit 20 at the same time as the coarse particles from the classifying conduit 20 pass in the reverse direction. This is completely achieved by adjusting the velocity and direction of flow of the fluid in the secondary conduit, and/or, as will be seen, the shape of the conduit, the position and size of the outlet means 36, the flow pattern in the classifying conduit 20 and other factors to be described.

The following examples will illustrate the invention as described up to this point, the apparatus being that disclosed in FIG. 1.

*Example No. 1*

As an example of the invention, wheat flour of 10–100 microns was fed into the classifying conduit 20 at the rate of 1,000 pounds per hour. A blower air pressure of 2–4 pounds per square inch was used. The amount of air introduced into the conduit amounted to 1,000 c.f.m and the pressure in the conduit was 2.2 inches of mercury. The amount of air introduced into conduit 38 was 300 c.f.m. and the pressure therein, 1.4 inches of mercury. The differential pressure between conduits 20 and 38 was, therefore .8 inch of mercury. On recovery of the material discharged from conduits 20 and 38, it was found that 65% of the material introduced was recovered as coarse material, 35% of the material being recovered as fine material. Analysis of the products plotted on a sedimentation curve showed a 40 micron cut with excellent efficiency. The coarse product had a lower protein constant than the fine product, as was desired.

*Example No. 2.—Wheat flour*

| | |
|---|---|
| Particle size of wheat flour introduced | 6 to 110 microns. |
| Rate of feed | 1,000 pounds per hour. |
| Amount of air used in conduit **20** | 1380 c.f.m. |
| Amount of air used in conduit **38** | 185 c.f.m. |
| Differential pressure between conduits **20** and **38** | 1.8 inches of mercury. |
| Results | 94.4% of material introduced was recovered as coarse material. 5.6% of material introduced was recovered as fine material. |

Analysis of products when plotted on a sedimentation curve showed a 20 micron cut with excellent efficiency. The coarse product had a lower protein content than that of the fine cut, as was desired.

*Example No. 3.—Ground silica*

| | |
|---|---|
| Particle size of ground silica introduced | 3.68% on 325 mesh screen. |
| Rate of feed | 600 pounds per hour. |
| Amount of air used in conduit **20** | 1025 c.f.m. |
| Amount of air used in conduit **38** | 225 c.f.m. |
| Differential pressure between conduits **20** and **38** | 0.4 inch of mercury. |
| Results | 94.2% of material introduced was recovered as fine material. 5.8% of material introduced was recovered as coarse material. |

Analysis of the fine product showed 100% of it to be finer than 325 mesh. As only 5.8% of the material introduced was lost as rejects, in comparison with the 3.68% on 325 mesh existing in the feed material, the efficiency was very high. The fine material recovered meets the most rigid specifications for commercial use.

*Example No. 4.—Ground pyrophyllite*

| | |
|---|---|
| Particle size of ground pyrophyllite introduced | 0.265% on a 100 mesh screen. |
| Rate of feed | 465 pounds per hour. |
| Amount of air used in conduit **20** | 800 c.f.m. |
| Amount of air used in conduit **38** | 185 c.f.m. |
| Differential pressure between conduits **20** and **38** | 0.5 inch of mercury. |
| Results | 90.7% of material introduced was recovered as fine material. 9.3% of material introduced was recovered as coarse material. |

Analysis of the fine product showed 100% of it to be finer than 100 mesh. This meets rigid specifications for the commercial product. It must be noted that it is unusually difficult to obtain a sharp classification of ground pyrophyllite, since the pyrophyllite particles have a plate-like thin edge structure which tends to cause them to classify in the air stream.

As illustrated in FIG. 3, a short straight section 48 preceded and followed by curved sections may comprise the secondary conduit in place of the continuously curved secondary conduit described above with respect to FIG. 1. The straight section 48, positioned adjacent the communicating passageway 36, may be of varying length depending on the flow pattern and type of classification sought. Generally, the continuously curved secondary conduit provides the results desired.

Figure 4:
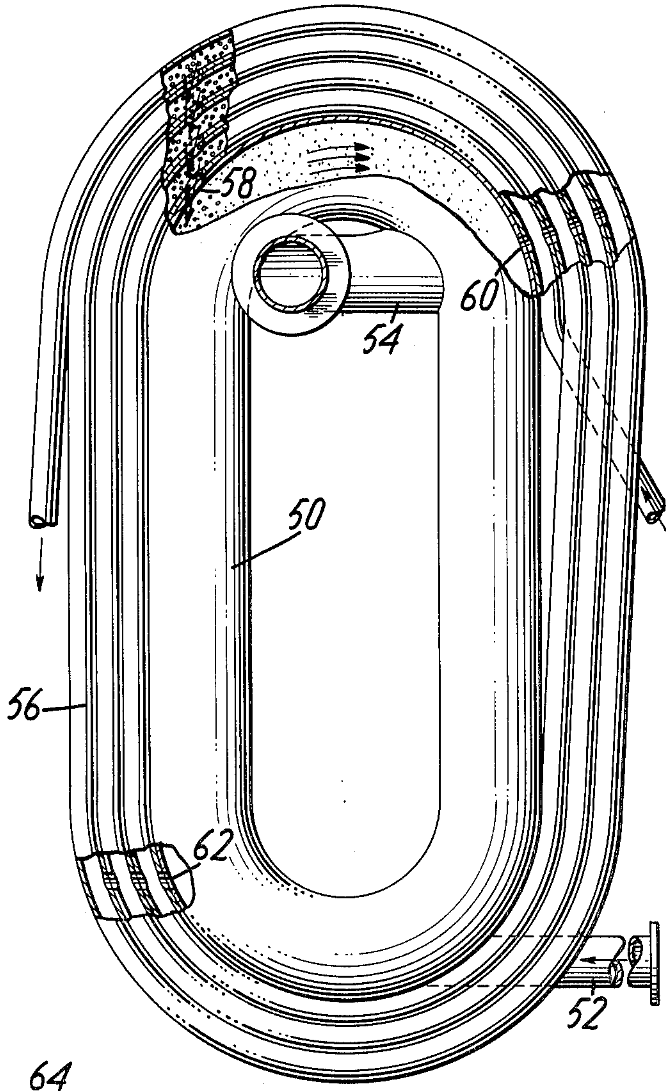
FIGURES 4–6 illustrate modifications of the classifying apparatus according to the invention.

In the arrangement illustrated in FIG. 4, there is provided an endless elongated conduit 50 having an oblong shape similar to the conduit 20 described with respect to FIG. 1 with semi-circular curved sections and straight sections forming an endless closed circuit. Fluid is introduced tangentially by input means 52 into a lower portion of the conduit 50, and discharge means 54 are provided on an inner wall of an upper curved section of the conduit extending angularly therefrom in a direction substantially reverse to that of the fluid flow.

As distinguished from the embodiment of FIG. 1, the apparatus is provided with a partially curved secondary conduit 56 extending continuously and repeatedly around the outer periphery of the classifying conduit 50. Fluid communicating passageways at points 58, 60, and 62, provide not only outlet means between the classifying conduit 50 and the secondary conduit 56, but also means for fluid communication between overlapping annularly disposed sections of successive, adjacent legs of the secondary conduit 56.

In both the classifying conduit 50 and overlapping sections of the secondary conduit 56, an inverse helical flow pattern with paths or areas of minimum and maximum velocities and static pressures is induced. The fluid velocities and direction of flow in the secondary conduit depend upon the type of classification desired. Preferably the direction of flow in the secondary conduit is in a counterclockwise direction.

It will be noticed that the points 58, 60 and 62 which are adjacent to the minimum velocity path as shown in FIG. 3 are selected to offer the optimum pressure differential, not only between the classifying conduit 50 and the secondary conduit 56, but also between successive legs of the secondary conduit. These points can be ascertained from an analysis of fluid velocities and static pressure gradients in the conduits for a predetermined set of conditions.

An advantage in this arrangement is that some of the finer particles which may have escaped from the classifying conduit into the secondary conduit at points 58, 60 and 62 will be forced by the static pressure differentials and double inverse helical flow patterns to return step by step through successive communicating passageways until they return to the endless tubular conduit 50 for discharge with other fine particles through means 54. Conversely, coarse particles having the desired particle size which are entrained in the fluid in the classifying conduit 50 and in inner legs of the secondary conduit may be conveyed successively or step by step into the more annularly disposed legs of the secondary conduit until they are discharged at one of the opens ends of the conduit. A suitable collection device may be located at said open end depending upon the direction of fluid flow in the conduit.

Figure 5:
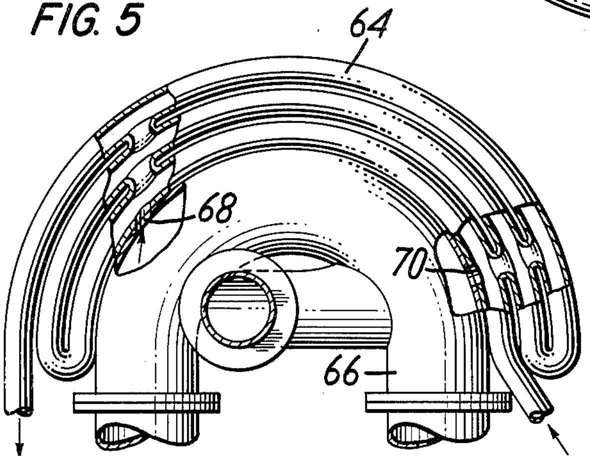

In the arrangement illustrated in FIG. 5, similar to that of FIG. 4, the secondary conduit 64 is arranged in a convoluted fashion to reverse on itself several times, each fold of the conduit being positioned adjacent to and concentric with the next inner one or to the endless tubular conduit 66. Again, means are provided to establish in the conduit 64 a double inverse helical flow pattern, in either direction, and areas of minimum and maximum velocity. Fluid communicating means are located at points 68 and 70, in areas of optimum pressure differentials, providing not only fluid communicating passageways between the classifying conduit and the secondary conduit, but also fluid communicating passageways between successive legs of the secondary conduit.

As in the embodiment illustrated in FIG. 4, finer particles which may have escaped the classifying conduit through means 68 and 70 will travel past successive communicating passageways to return step by step to the endless tubular classifying conduit. Conversely, coarse particles entrained in the fluid in the secondary conduit 64 will rapidly work their way to be discharged through one of the open ends, depending upon the direction of the fluid flow in conduit 64, into a suitable collection device.

Figure 6:
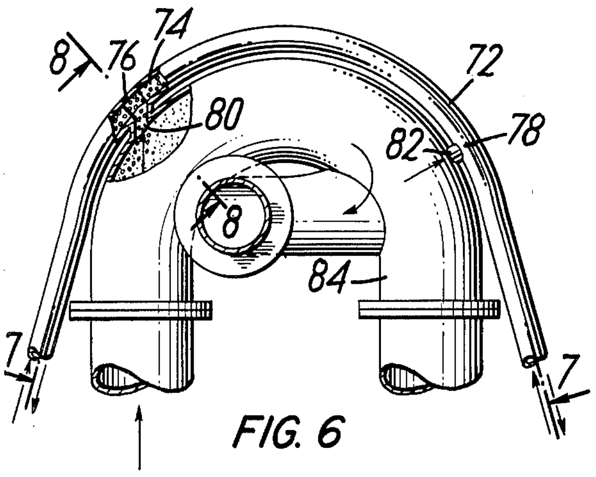

FIG. 6 illustrates an embodiment which is effective in obtaining optimum classification. The annular secondary conduit 72 in this embodiment is provided with an elongated radially disposed partition 74 extending along its length but interrupted at points 76 and 78 adjacent to the fluid communicating passageways 80 and 82.

Figure 8:
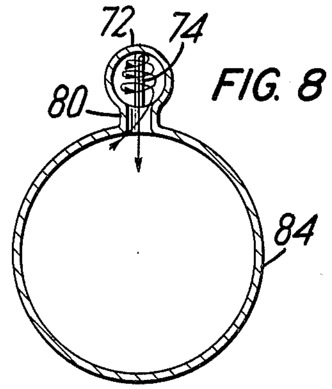
FIGURE 8 is a section view taken along line 8—8 of FIG. 6.
Figure 7:
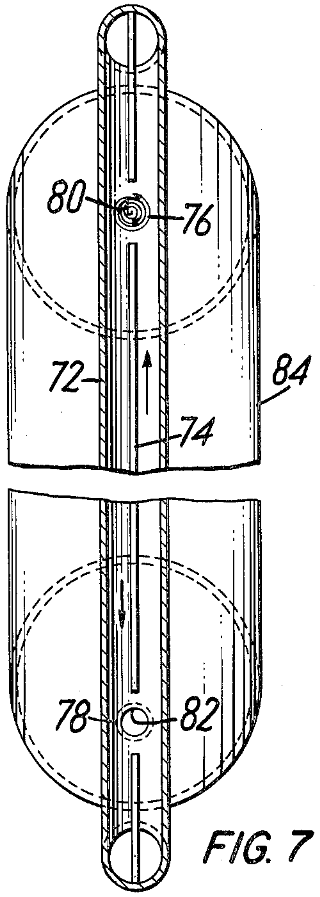
FIGURE 7 is a section view taken along line 7—7 of FIG. 6.

FIGS. 7 and 8 illustrate more clearly the orientation of the partition and the fluid flow in the secondary conduit, which fluid flow, as shown in FIG. 7, is in one direction on one side of the partition, and in the opposite direction on the other side of the partition. The oppositely flowing streams coming in contact at points 76 and 78 set up a spiralling vortex flow, illustrated in FIG. 8, the fluid flow from the classifying conduit 84 with coarse particles entrained therein following a generally spiralling upwardly directed path along the periphery of the vortex, part of the flow at the top of the vortex reversing direction and passing downwardly at a higher velocity through the center of the vortex. The fluid flow in the center of the vortex, having the higher velocity, captures the finer particles and returns them to the classifying conduit 84. It is apparent that the device is extremely effective in preventing the classification of finer particles through the annular secondary conduit 72, thereby sharpening the cut removed through the secondary conduit. Similar means may be utilized at any of the fluid communicating passageways described with respect to the embodiments of FIGS. 1, 4 and 5.

Further, it is apparent that the arrangements of FIGS. 4, 5, and 6 are capable of sharp classification without a carry-over of desirable material with the rejected material because of the additional turns of the secondary conduit or the vortex created by the partition in the secondary conduit.

Figure 9:
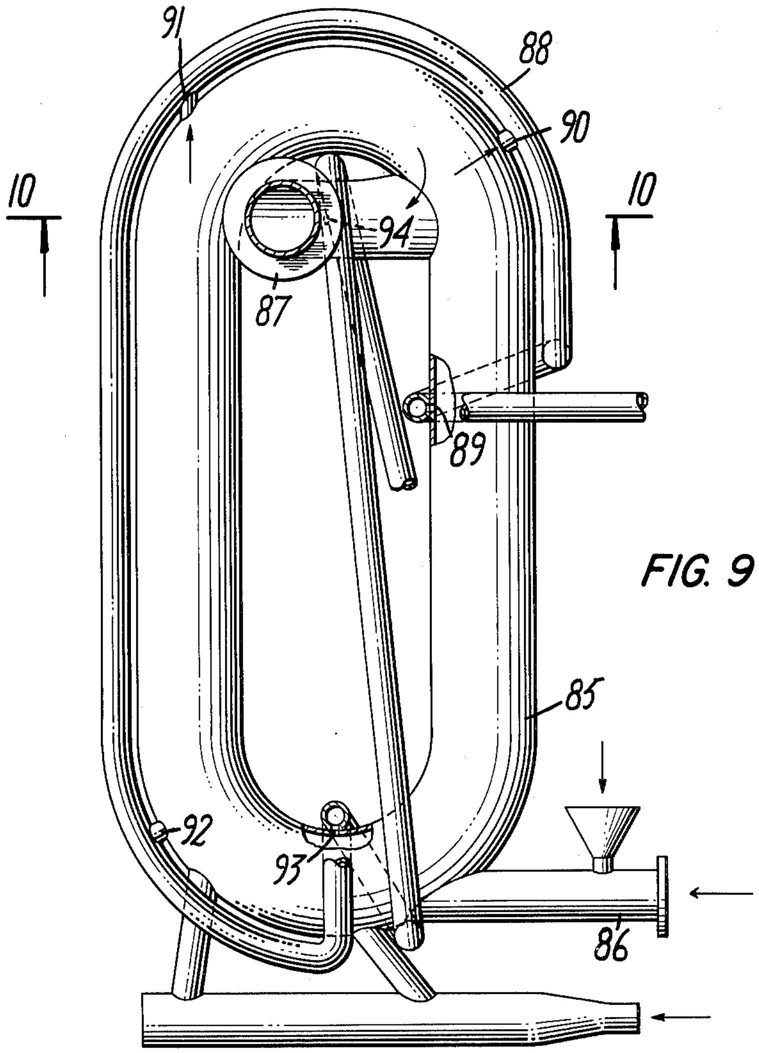
FIGURE 9 illustrates a further modification of the classifying apparatus according to the invention.

In the construction illustrated in FIG. 9, an endless tubular conduit 85 is provided with input means 86 by which fluid and particles entrained therein are introduced into the conduit, and means 87 by which finer particles are discharged from the conduit.

In this embodiment of the invention, the secondary conduit 88 extends about the classifying conduit 85 so as to communicate with the classifying conduit by means of passageways 89, 90, 91 and 92 positioned adjacent to areas of minimum velocity and high static pressure in the classifying conduit. The coarser particles entrained in the fluid passing through the classifying conduit are classified through these outlets. The secondary conduit 88 is further arranged to encircle and communicate with the classifying conduit at point 93 which is adjacent to an area of negative pressure (described above with respect to FIG. 3) in the classifying conduit. As a result of the negative pressure, finer particles which may have escaped from the classifying conduit into the secondary conduit at points 89–92 will concentrate along the inner periphery of the secondary conduit in the area of the point 93 and, by the principles described heretofore, will be reintroduced into the classifying conduit. The coarser particles in the secondary conduit which fail to make the substantially reverse turn continue on in the secondary conduit 88.

The secondary conduit is also arranged to pass radially around a portion of the discharge tube 87 as shown in FIG. 9, and to come in contact with an opening or communicating passageway 94 located on an inner radius of curvature of the discharge tube. Along this inner radius is another area of high velocity or low pressure, and any fine particles remaining in the secondary conduit 88 accordingly travel into the discharge tube, to be discharged with the main body of fine particles. Coarser particles, which again cannot reverse direction as readily, continue on in the conduit 88 to a suitable collection device. It is apparent, that the system provides an efficient and effective way of obtaining fine classification of material without a carry-over of valuable material with rejected material.

Figure 10:
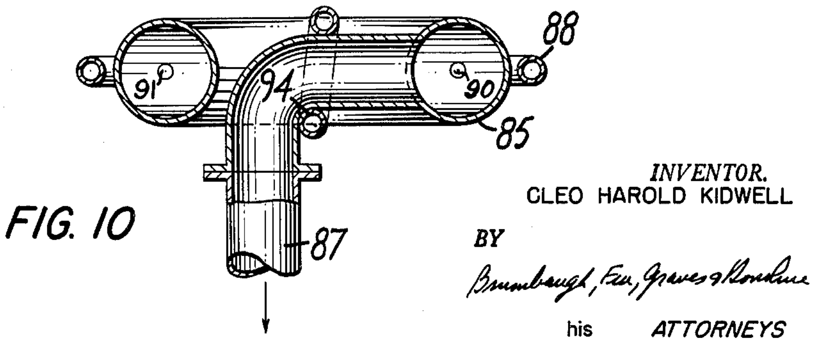
FIGURE 10 is a section view taken along line 10—10 of FIG. 9.

FIG. 10 illustrates in cross-section the arrangement of the secondary conduit in the area of the discharge tube 87. Fluid flowing around the inner radius of the bend of the discharge tube will break away from the inner periphery to induce a negative pressure adjacent the communicating passageway 94.

Figure 11:
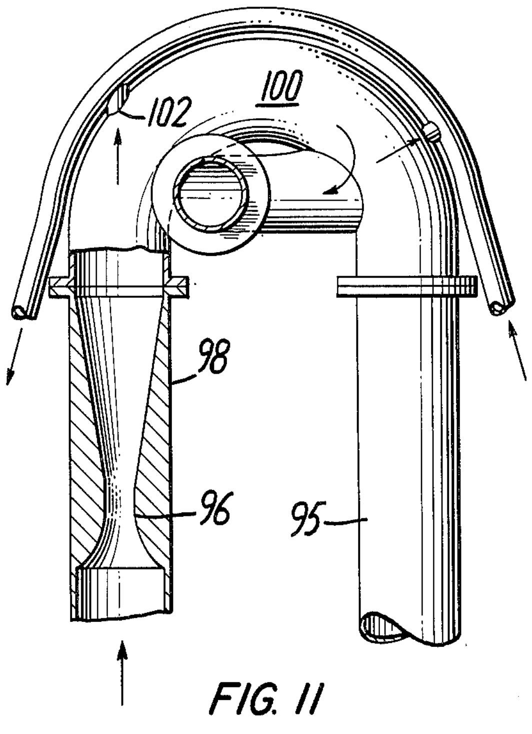
FIGURES 11–15 illustrate further modifications of the classifying apparatus according to the invention.

In the classifying conduit 95 illustrated in FIG. 11, a portion 96 of the straight tubular section 98 immediately preceding the upper curved section 100 of the conduit is provided with a venturi shaped passageway arranged directly toward the outlet means 102 to concentrate the coarse particles entrained in the fluid into the area of the outlet means 102. With this arrangement, the coarse, heavy particles tend to continue in a straight line from the venturi to the outlet 102 while the lighter particles tend to follow the flow of air through the curved section 100.

Figure 12:
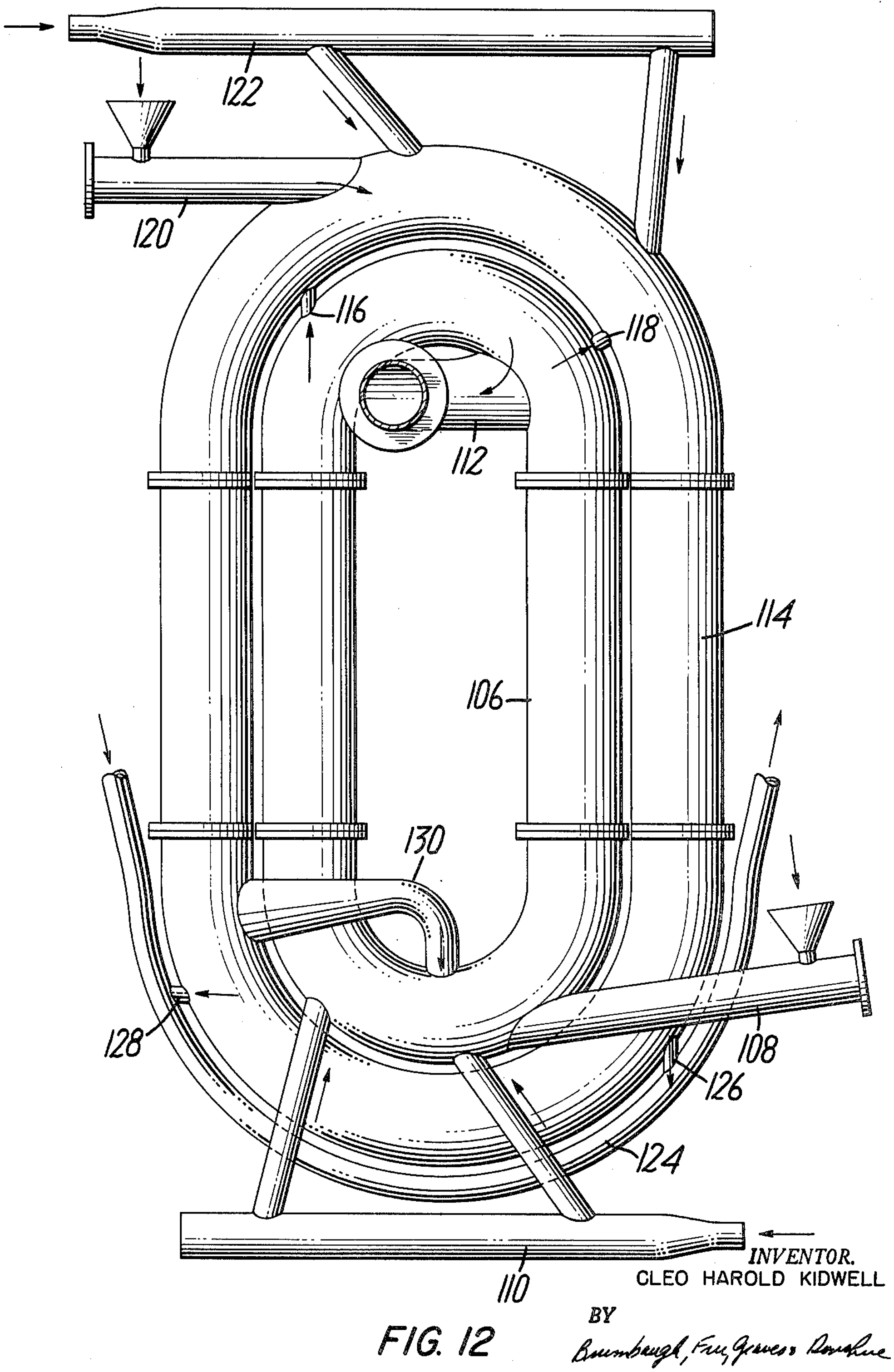

In the embodiment illustrated in FIG. 12, a first endless tubular conduit 106 is provided with input means 108 for entrained unclassified material and 110 for fluid with or without entrained unclassified material, and discharge means 112 through which the finer particles are classified. A secondary conduit 114 is disposed annularly about the classifying conduit 106, and is a similar endless tubular conduit of the same diameter. Coarse particles escaping through communicating passageways 116 and 118 enter the flow of the secondary conduit. It will be noticed that the arrangement of the secondary conduit is substantially identical to the arrangement of the classifying conduit 106, and in the same vertical plane, except that the secondary conduit is inverted relative to the classifying conduit. The input means 108 and 110 of the classifying conduit 106 are arranged so as not to physically interfere with the secondary conduit 114.

Fluid, with or without entrained and unclassified material, may be introduced through input means 120 and 122 into an upper curved section of the secondary conduit and arranged to induce in the conduit a clockwise double inverse helical flow similar to the flow on the classifying conduit 106. A third conduit 124 is positioned annularly about a lower section of the secondary conduit and is in fluid communication with it through outlet means 126 and 128. A double inverse helical flow is also induced in the third conduit, resulting in further classification of coarse material between the secondary conduit and the third conduit following the principles outlined with respect to the arrangement of FIG. 1.

Finer particles traveling in the secondary conduit 114 are discharged through a discharge means 130, positioned on an inner periphery of a curved section of the conduit removed from the input means 120 and 122. The discharge means is arranged to feed the finer particles back into the classifying conduit 106, introducing them into the conduit in an area of negative pressure. These fine particles are discharged with the main body of classified material through discharge means 112 of the classifying conduit. By suitably adjusting the velocities and flow patterns in the classifying conduit 106 and in the secondary conduit 114, fine particles may also be caused to flow in a direction in communicating passageways 116 and 118 opposite to the direction of flow of the coarser particles.

Although the conduits 106 and 114 are shown as being of equal diameter, they may be larger or smaller in diameter with respect to each other. The important consideration is in maintaining the fluid flow in each of the three respective conduits at a predetermined relationship with rsepect to each other to achieve the static pressures, velocity pressures and flow patterns necessary to obtain the particular classification sought. It is apparent that the apparatus will afford a sharp classification with practically no loss of classified material with rejected material. Further, material to be classified may be introduced initially in the secondary conduit simultaneously with the introduction of material in the classifying or first conduit to result in an operation of optimum efficiency.

Figures 13, 19:
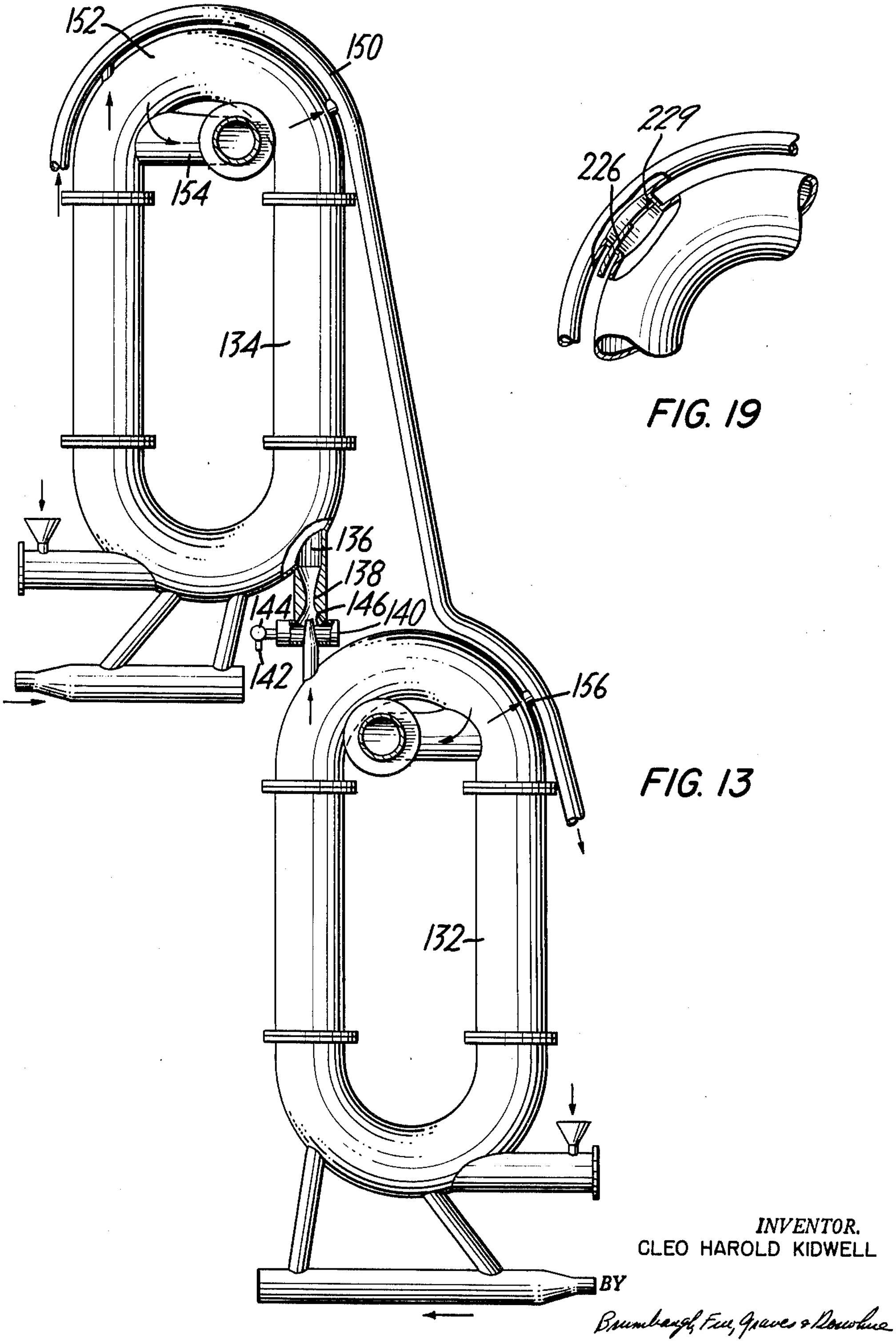

A further embodiment of the invention is illustrated in FIG. 13, and comprises a first or classifying endless, elliptical tubular conduit 132 in fluid communication with a secondary conduit 134, the secondary conduit also having an endless elliptical configuration. The classifying conduit and secondary conduit are arranged in the same vertical plane but are offset with respect to each other, and are in fluid communication through a connecting passageway 136 extending between an area of minimum velocity and high fluid static pressure in the classifying conduit and an area of relatively higher velocity and preferably lower fluid static pressure in the secondary conduit since the passage 136 is close to the input means of the secondary conduit 134 and relatively remote from the input means of the first conduit 132.

The connecting passageway 136 is provided with a venturi passage 138 upstream of a manifold 140, the later being adapted to receive additional fluid from a pipe

142 through a valve 14. The manifold 140 is positioned with respect to the venturi passage in a manner providing an annular nozzle 146 at the entrance of the venturi adapted to inject fluid into the flow stream between the conduits. This arrangement is effective in controlling the back pressure in the passageway 136 or desired differential pressure which affects the rate of flow of the coarse particles from the classifying conduit to the secondary conduit and cut obtained.

After the coarse particles have entered conduit 134, they are subjected to further classification passing eventually into a third curved conduit 150 annularly disposed about the upper curved section 152 of the secondary conduit. The principles of the invention described in connection with the embodiment of FIG. 1 are applicable to classification of the coarse particles to the third conduit 150. Finer particles in the conduit 134 are discharged through means 154 in the manner described with respect to FIG. 1.

In the arrangement illustrated in FIG. 13, the fluid flow in the secondary conduit is preferably in a counterclockwise direction, the fluid flow in the third conduit 150 being preferably in a clockwise direction. It will be noticed that the third conduit 150 may also be in communication wtih the classifying conduit 132 at point 156 for the removal of additional coarse particles from the classifying conduit, if desired.

Figure 14:
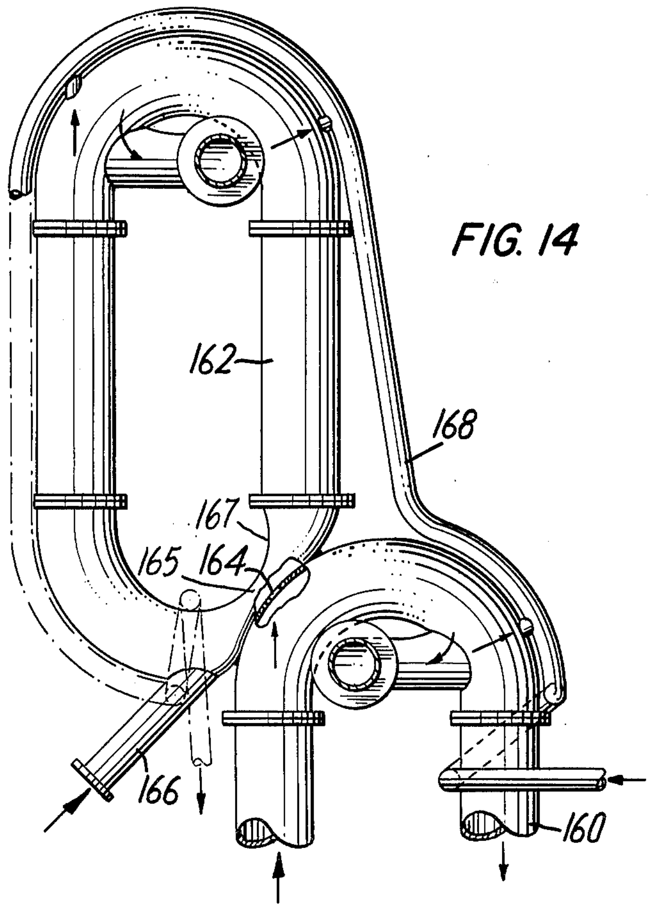

In the arrangement illustrated in FIG. 14, which is similar to that of FIG. 13, unclassified material is introduced into the primary classifying conduit 160 and circulated in a clockwise direction in the manner described. Part of the material is classified into a secondary conduit 162 through outlet means 164 positioned on an outer periphery of the classifying conduit, while finer material is discharged through means positioned on an inner periphery thereof. The secondary conduit, which is in communication with the outlet 164 is also a tubular conduit having straight and curved sections arranged to form a closed circuit, and is positioned above the classifying conduit in the same vertical plane. The axis of the secondary conduit is, however, offset from the vertical axis of the primary conduit as in the embodiment of FIG. 13. In the secondary conduit, adjacent to and upstream of the outlet 164, a venturi restriction 165 is provided and positioned so as to produce a negative pressure in the secondary conduit at the mouth of the outlet. This venturi may be formed, as shown, in part by the outer curved wall of the classifying conduit and in part by the extended or stretched-out inner periphery 167 of the secondary conduit, or may be molded into the secondary conduit. Flow of fluid with or without entrained unclassified material is introduced into the secondary conduit by input means 166 positioned relative to the venturi restriction so that by controlling the rate of flow into the secondary conduit, the desired classification is obtained.

The third conduit 168 is positioned about the secondary conduit, and if desired adjacent to the classifying conduit 160 according to the principles of the invention, to obtain a fine classification and a lesser loss of useful material. If desired, this conduit may encircle both of the conduits 160 and 162 in the manner illustrated in FIG. 14 so as to communicate with an additional point of positive pressure and a negative pressure point at the downstream side of the conduit 168 for the purpose described above with reference to FIG. 9.

Figure 15:
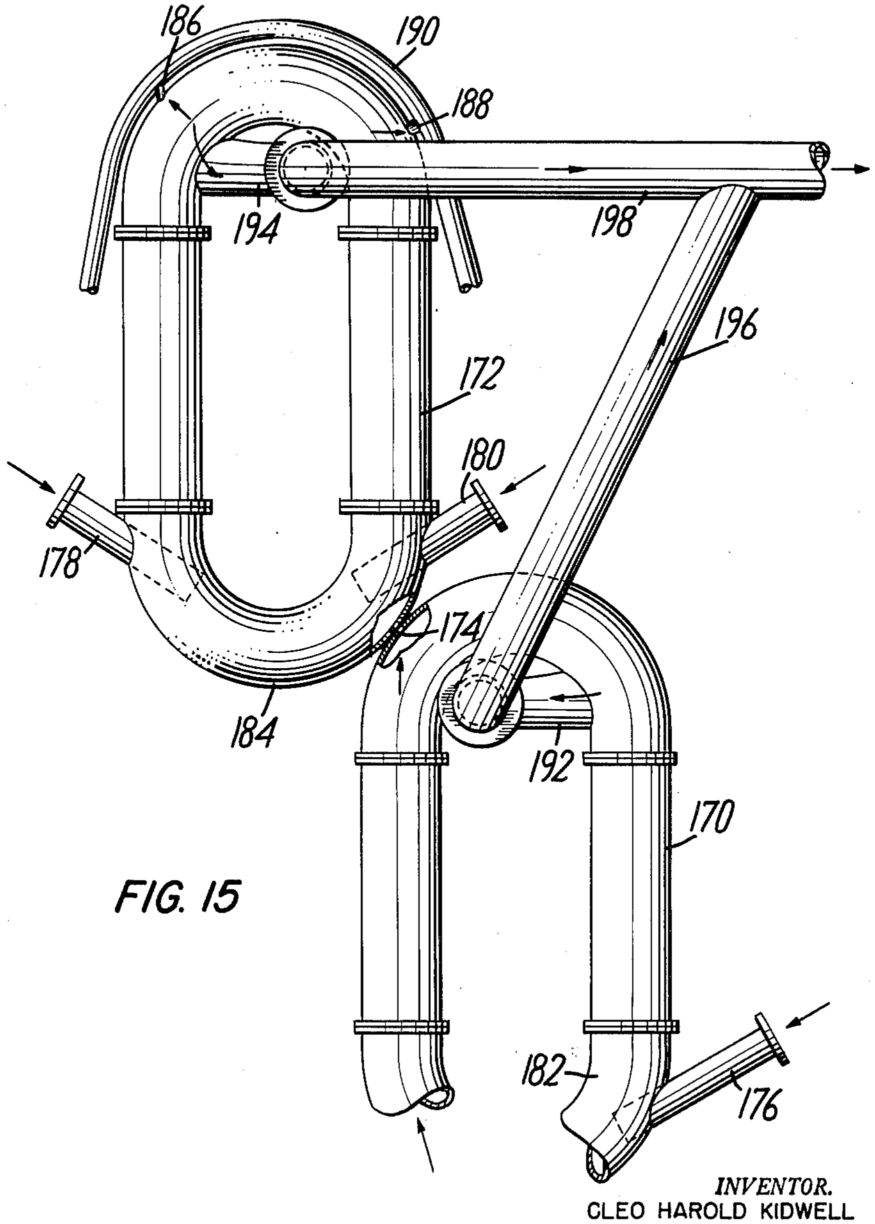

FIG. 15 illustrates a further embodiment of the invention which is similar to those of FIGS. 13 and 14, but with certain modifications. In this embodiment the secondary conduit 172 is disposed again above but offset from the classifying conduit 170, and in fluid communication with it by means of passageway 174.

The flow of coarse particles from the classifying conduit to the secondary conduit may be controlled precisely by fluid velocities, fluid pressures, and flow patterns maintained in the respective conduits. In this respect, and to facilitate the introduction of fluid and entrained material into the classifying conduit, an input tube 176 introducing fluid into the lower curved section 182 of the conduit is oriented at an angle with respect to the radius of curvature of the curved section, and is projected into the stream of fluid to reach points of lower static pressure than those existing at the outer periphery of the curved section. Also, in this respect, similarly angled input tubes 178 and 180 projecting into the flow in the lower curved section 184 of the secondary conduit may be employed in setting up in the secondary conduit the desired flow pattern. Either one of the input tubes 178 or 180 may be employed, but preferably not simultaneously, the unused tube being closed off. As with the embodiments of FIGS. 13 and 14, coarse particles in the secondary conduit are discharged through outlets 186 and 188 to a third curved conduit 190.

Discharge means 192 and 194 for the classifying and secondary conduits are provided by which fine particles are discharged, using the principles described. The discharge means of the first and second conduits are arranged to lead to a common collection device by way of conduits 196 and 198 to be combined into a composite product.

FIG. 16 illustrates a preferred arrangement for the discharge tube 206 of the classifying and secondary conduits, and comprises a gate or extension 202 which is contiguous with the inner periphery 204 of the curved conduit, but which projects beyond the inner periphery across the mouth of the discharge tube 206 to introduce in the flow an eddy formation designated by the numeral 208. Fine particles entrained in the fluid tend to flow into the eddy resulting in improved classification.

A somewhat similar effect may be achieved by positioning guide vanes 210 in the mouth of the discharge tube 212 in the manner illustrated in FIG. 17. The vanes may be made adjustable as by a control shaft connected to all the vanes to assist in classification.

Various arrangements may be utilized in conjunction with the outlets or passageways for fluid communication between the classifying conduit and secondary conduits.

Figure 18:
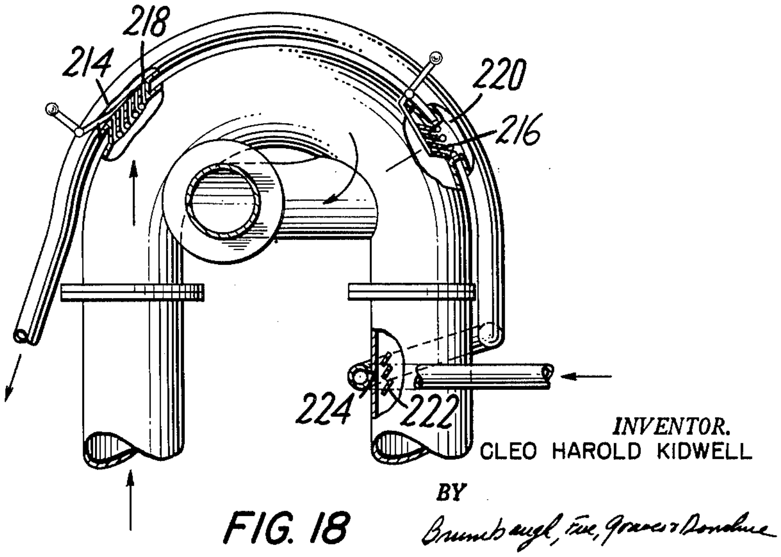

One example is illustrated in FIG. 18. As shown, classification may be assisted by positioning adjustable guide vanes 214 and 216 at the various outlets or points of fluid communication 218 and 220 between the classifying and secondary conduits. The vanes are pivotally supported and are adjusted by moving a pivoted control shaft connected through a link to all of the vanes. Such adjusting arrangements are conventional and are not of patentable significance. Classification even at point 224 may be facilitated by suitably located guide vanes 222.

FIG. 19 illustrates one means for adjusting the areas of the outlets or communicating passageways between the first and secondary conduits. A plate or gate-like member 226 may be disposed across the outlet 229 in such a manner as to permit increasing or decreasing the area of the outlet. The area of the outlet and volume of flow through the outlet has a direct effect on the classification obtained. An external calibrated screw or other similar device may be attached to the plate to enable an operator to select the desired area Other types of devices, for instance a shutter-like device, used in a camera, may be used to control the area.

Figure 20:
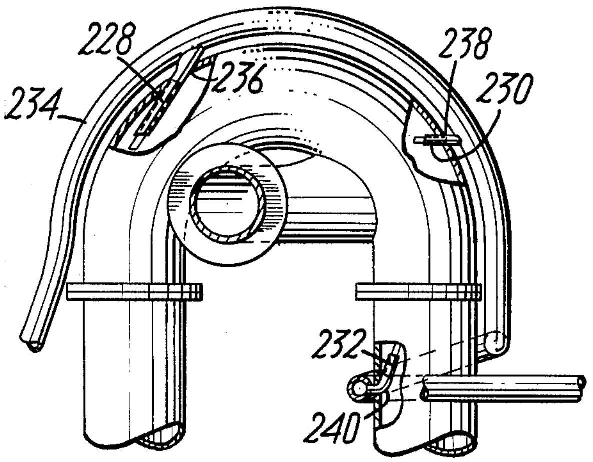

A further example is illustrated in FIG. 20 and comprises tubular-scoop-like extensions or probes 228, 230 and 232 in fluid communication with the secondary conduit 234 and protruding into the flow path in the classifying conduit. Such extensions or probes may be as shown integral with or attached to the secondary conduit and extending through outlets 236, 238, and 240. The extensions, however, are properly made adjustable, as by telescoping, so as to be capable of being introduced into desired areas of the flow in the classifying conduit, i.e., those areas which may be used to best advantage to obtain the desired classification, depending upon the flow pattern. The extensions may be made retractable or telescopic or otherwise arranged to obtain the results desired. Telescoping or retracting extensions are conventional and are not of patentable significance.

FIGS. 21–24 inclusive, are plan views of upper curved sections of the classifying conduits and illustrate variour shapes and arrangements for the outlets between the classifying and secondary conduits.

Figure 21:
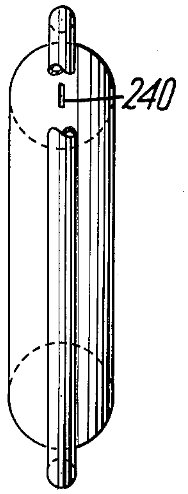
Figure 22:
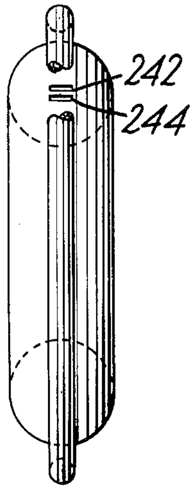
Figure 23:
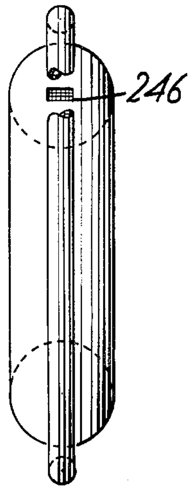
Figure 24:
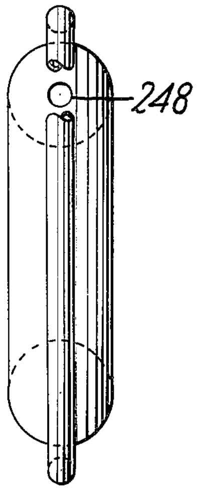

In FIG. 21, the outlet is fashioned in the form of a slot 240 positioned in a plane parallel to that in which the classifying conduit is oriented. In FIG. 22, the outlet 242, also fashioned in the form of a slot, is oriented transverse to the plane of the classifying conduit. An additional (or several additional) closely spaced slot 244, may be disposed adjacent to the slot 242, is desired. In FIG. 23, a screen 246 is placed across the mouth of the outlet, to control the classification, or a circular opening 248 may be used as illustrated in FIG. 24. In FIG. 24, the area may be made adjustable by a variable size opening similar to the conventional variable lens opening known as a "Waterhouse stop" used in a camera.

Other modifications will be apparent to those skilled in the art, and the present invention should be limited only as defined in the following claims.

What is claimed:

1. In an apparatus for classifying and reducing material, the combination comprising an endless elongated conduit disposed about a common axis to form a substantially closed circuit and having a curved section and a preceding straight section therein so as to cause double inverse helical flow of a fluid circulated in the elongated conduit, means for supplying fluid to said conduit at a location remote from said curved section so as to induce fluid flow in a given direction in the conduit, means for entraining and conveying material in the fluid supplied to the conduit, discharge means positioned on an inner periphery of said curved section and extending angularly therefrom in a direction approximately reverse to that of the fluid flow in said conduit, means forming at least one outlet positioned in said conduit along the outer periphery of the curved section and in line with said preceding straight section, a second conduit independent of the first conduit having at least one curved section and in fluid communication with the outlet formed by said outlet means, and means to establish in said second conduits a fluid flow pattern by which material of a desired particle size is caused to flow from said first conduit to said second conduit.

2. In an apparatus for classifying and reducing coarse and fine material, the combination comprising an endless elongated first conduit disposed about a common axis to form a substantially closed circuit and having a curved section and a preceding straight section therein so as to cause double inverse helical flow of a fluid circulated in the elongated conduit, means for supplying fluid to said conduit at a location remote from said curved section so as to induce fluid flow in a given direction in the conduit, means for entraining and conveying material in the fluid supplied to the conduit, discharge means positioned on an inner periphery of said curved section and extending angularly therefrom in a direction substantially reverse to that of the fluid flow in said conduit, means forming at least one outlet positioned in an outer periphery of said curved section and in line with said preceding straight section, a second conduit independent of the first conduit extending at least in part concentric with and adjacent to said outer periphery of said curved section in the proximity of said outlet means, a communicating fluid passageway between the outlet formed by said outlet means and said second conduit and means to establish in said second conduit a fluid flow pattern by which coarse material is caused to flow from said first conduit to said second conduit through said passageway.

3. In an apparatus for classifying and reducing material according to claim 2 including means for causing the fluid in said second conduit to flow in a direction opposite to that of the fluid flow in said first conduit.

4. In an apparatus for classifying and reducing material according to claim 2, wherein said endless elongated conduit is of a substantially circular cross-section, said curved section in which said discharge means and outlet means are disposed comprising the uppermost part thereof and having a total curvature of about 180°.

5. In an apparatus for classifying and reducing material according to claim 4, wherein said means for supplying fluid to said endless elongated conduit is positioned in a bottommost curved section of said conduit at a point removed from said discharge means.

6. In an apparatus for classifying and reducing material, the combination comprising an endless elongated first conduit having curved sections in the length thereof, said curved sections being connected by straight sections to form a closed circuit whereby a double inverse helical flow pattern will be induced in a fluid circulated therein, means for supplying fluid into one of said curved sections so as to induce flow in a given direction through said conduit for setting up in said conduit a double inverse helical flow pattern having areas of minimum and maximum fluid pressures, means for entraining material in the fluid supplied to the conduit, discharge means positioned on an inner periphery of another of said curved sections and extending angularly therefrom in a direction substantially reverse to that of the fluid flow in said conduit, an open-ended second conduit independent of the first conduit having curved sections and extending in spiral fashion around the outer periphery of said first conduit, means to establish in said second conduit a flow pattern and areas of minimum and maximum fluid pressures, and means providing at least one fluid communicating passageway between said first and second conduits and between adjacent portions in the spiral of said second conduit by which coarse and fine particles of said entrained material are classified and discharged through an open end of said second conduit and through said discharge means, respectively.

7. In an apparatus for classifying and reducing material, the combination comprising an endless elongated first conduit having curved sections in the length thereof, said curved sections being connected by straight sections to form a substantially closed circuit whereby a double inverse helical flow pattern will be induced in a fluid circulated therein, means for supplying fluid to one of said curved sections so as to induce flow in a given direction through said conduit for setting up in said conduit a double inverse helical flow pattern having areas of minimum and maximum fluid pressures, means for entraining material in the fluid supplied to the conduit, discharge means positioned on an inner periphery of another of said curved sections and extending angularly therefrom in a direction substantially reverse to that of the fluid flow in said conduit, an open-ended second conduit independent of the first conduit having multiple curved sections and positioned, at least in part, adjacent to said first conduit, said second conduit being convoluted to reverse on itself several times each fold thereof being positioned adjacent to and concentric with said other curved section, means to establish in said second conduit a fluid flow having areas of minimum and maximum fluid pressures, and means providing at least one fluid communicating passageway between said first and second conduits and between overlapping portions of said second conduit by which coarse and fine particles of said entrained material are classified and discharged through an open end of said second conduit and through said discharge means, respectively.

8. In an apparatus for classifying and reducing material, the combination comprising an endless elongated first conduit having curved sections in the length thereof, said curved sections being connected by straight sections to form a closed circuit whereby a double inverse helical flow pattern will be induced in a fluid circulated therein, means for supplying fluid to one of said curved sections so as to induce flow in a given direction through said conduit for setting up in said conduit a flow pattern having areas of minimum and maximum fluid pressures, means for entraining material in the fluid supplied to the conduit discharge means positioned on an inner periphery of another of said curved sections and extending angularly therefrom in a direction substantially reverse to that of the fluid flow in said conduit, a second conduit having at least one curved section and positioned at least in part adjacent to said first conduit, and means providing at least one fluid communicating passageway between the outer periphery of a curved section of said first conduit and the inner periphery of a curved section of said second conduit to obtain classification of said entrained material, said second conduit having a longitudinally extending and radially disposed partition dividing said conduit along the length thereof, said partition bieng interrupted in the proximity of said at least one passageway, and means to establish in said second conduit on opposite sides of said partition a fluid flow by which fine particles removed from said first conduit are returned thereto.

9. In an apparatus for classifying and reducing coarse and fine material, the combination comprising an endless elongated first conduit having curved sections in the length thereof, said curved sections being connected by straight sections to form a substantially closed circuit, means for supplying fluid into one of said curved sections for setting up in said conduit a flow pattern having areas of minimum and maximum fluid pressures at different locations adjacent to the walls of the conduit, means for entraining material in the fluid supplied to the conduit, discharge means positioned on an inner periphery of another of said curved sections in an area of minimum fluid pressure and extending angularly therefrom in a direction substantially reverse to that of the fluid flow in said conduit, means forming an aperture positioned in said conduit in the outer peripheral wall of a curved section thereof and means forming at least one additional aperture positioned in the inner peripheral wall of a curved section thereof, a second conduit in communication with said first and second mentioned apertures and having straight and curved sections for establishing therein a flow pattern having areas of minimum and maximum fluid pressures, said second conduit being arranged so that points thereof in communication with said apertures are in the inner peripheral wall of the curved sections in said second conduit, the point of communication with said aperture in the inner peripheral wall of the first mentioned conduit being downstream in the second conduit of said other points of communication.

10. In an apparatus for classifying and reducing coarse and fine material, the combination comprising endless elongated independent first and second conduits each having curved sections in the length thereof connected by straight sections to form substantially closed circuits, means for supplying fluid into predetermined ones of said curved sections and for setting up in said conduits flow patterns having areas of maximum and minimum fluid pressures at different locations adjacent to the walls of the conduits, discharge means for each of said conduits positioned in the inner peripheral walls of predetermined others of said curved sections and extending angularly therefrom in directions substantially reverse to the fluid flow in said conduits, means to entrain unclassified material in the flow of at least one of said conduits, a third open-ended conduit having at least one curved section, means to establish in said third conduit a flow pattern having areas of minimum and maximum pressures, and means to provide fluid communication between the inner periphery of a curved section of each of the second and third conduits and the outer periphery of a curved section of the preceding conduit, whereby coarse particles are discharged through said open-end of said third conduit and fine particles through said discharge means.

11. In an apparatus according to claim 10, wherein said first and second conduits are oriented in the same vertical plane but positioned concentric with respect to each other, the fine particles discharged through the discharge means of said second conduit being introduced into the first conduit at the inner periphery of a curved section thereof.

12. In an apparatus according to claim 10, wherein said first and second conduits are oriented in the same vertical plane but positioned one above the other, said second conduit being provided with means for affecting a negative pressure in said second conduit adjacent means of communication between said first and second conduits.

13. In an apparatus according to claim 12, including a venturi restriction associated with said means of communication.

14. In an apparatus according to claim 10, wherein said third conduit is arranged with respect to said first and second conduits to include means downstream in said third conduit from said predetermined points communicating with the inner peripheral wall of a curved section in one of said first and second conduits so that fine particles inadvertently contained in the flow in said third conduit are reintroduced into the flow in one of said first and second conduits.

15. In an apparatus for classifying and reducing material, the combination comprising independent first and second conduits one of which comprises curved sections in the length thereof connected by straight sections to form a substantially closed, endless circuit, means to supply fluid into one of said curved sections for setting up in said endless conduit a double inverse helical flow pattern and areas of minimum and maximum fluid pressures at different locations adjacent to the walls of the conduit, means for entraining material in the fluid supplied to the conduit, discharge means positioned on an inner wall of another of said curved sections and extending angularly therefrom in a direction substantially reverse to that of the fluid flow in said conduit, means to establish in said second conduit a double inverse helical flow pattern and areas of minimum and maximum fluid pressures, and means providing fluid communication between the outer peripheral wall of a curved section of said first and conduit and the inner peripheral wall of a curved section of said second conduit to utilize pressure differentials existing between predetermined areas of said conduits and said double inverse helical flow patterns whereby coarse particles are discharged through said second conduit and fine particles through said discharge means.

16. In an apparatus according to claim 15 wherein said last named means includes adjustable elongated, scoop-like probe means in fluid communication with said second conduit and adapted to penetrate to a predetermined location in the flow in said first conduit.

17. In an apparatus according to claim 15, wherein said last named means includes means forming an outlet in said first conduit and a plurality of adjustable vanes positioned at the mouth of said outlet means penetrating into the flow in the outlet formed by said first conduit.

18. In an apparatus according to claim 15 wherein said last named means includes means forming an outlet in said first conduit and adjustable closure means adapted to control the flow through the outlet formed by said outlet means.

19. In an apparatus according to claim 15 wherein said discharge means is provided with an extension of said curved section extending, in the approximate direction of flow in the conduit, across a portion of the mouth of the discharge means.

20. In an apparatus according to claim 15 wherein said discharge means is provided with vanes positioned in the mouth thereof.

21. A method for classifying material comprising the steps of entraining material in a stream of flowing fluid, inducing a double inverse helical flow pattern having different high velocity and low velocity paths in the stream, directing the stream in a substantially straight line path, deflecting the stream away from the straight line path so that the high velocity flow path is deflected sharply and carries with it light particles and the low velocity path is transposed in the stream with respect to the high velocity path at the point of deflection, and collecting heavy particles at a point substantially in line with the straight line path of the stream but beyond the point of deflection of the stream by passing another stream of flowing fluid past the collection point in communication with the stream carrying entrained material at the collection point and in a direction opposite to the flow direction of that stream.

22. A method according to claim 21 including the step of directing the other stream downstream of the collection point in a curved path adjacent to the stream carrying entrained material and in communication therewith along the interior of the curved path so as to return thereto any light particles inadvertently collected at the collection point.

References Cited by the Examiner

UNITED STATES PATENTS

| | | | |
|---|---|---|---|
| 821,819 | 5/1906 | Neumann | 209—143 |
| 2,051,107 | 8/1936 | Rourke | 209—145 |
| 2,091,514 | 8/1937 | Meston | 209—154 X |
| 2,219,011 | 10/1940 | Kidwell et al. | 241—39 |
| 2,237,091 | 4/1941 | Stephanoff | 241—5 |
| 2,284,746 | 6/1942 | Kidwell | 241—39 |
| 2,705,074 | 3/1955 | Harvengt | 209—139 |
| 2,792,114 | 5/1957 | Kidwell et al. | 209—139 |
| 3,013,663 | 12/1961 | Vane | 209—144 |
| 3,077,407 | 2/1963 | Rozsa | 99—93 |

FOREIGN PATENTS

| | | |
|---|---|---|
| 47,416 | 4/1909 | Switzerland. |

OTHER REFERENCES

"Six Years of Impact Milling—and Air Separation for Protein Fractionation," by Fritz Haiser. American Miller and Processor, August 1960, pages 14–16 and 36. (Photostat in 241–5.)

HARRY B. THORNTON, *Primary Examiner.*

HERBERT L. MARTIN, ROBERT A. O'LEARY, *Examiners.*

FRANK W. LUTTER, W. C. MACKEY, *Assistant Examiners.*